United States Patent
Meijer et al.

(10) Patent No.: US 8,209,674 B2
(45) Date of Patent: Jun. 26, 2012

(54) TIER SPLITTING SUPPORT FOR DISTRIBUTED EXECUTION ENVIRONMENTS

(75) Inventors: Henricus Johannes Maria Meijer, Mercer Island, WA (US); Brian C. Beckman, Newcastle, WA (US); Christopher W. Brumme, Mercer Island, WA (US); Mark B. Shields, Seattle, WA (US); Wei Zhu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1508 days.

(21) Appl. No.: 11/674,041

(22) Filed: Feb. 12, 2007

(65) Prior Publication Data

US 2008/0196025 A1 Aug. 14, 2008

(51) Int. Cl.
- *G06F 9/44* (2006.01)
- *G06F 9/45* (2006.01)
- *G06F 15/16* (2006.01)
- *G06F 3/00* (2006.01)

(52) U.S. Cl. ........ 717/151; 717/106; 717/121; 717/149; 719/318; 719/330; 709/201; 709/203

(58) Field of Classification Search .................. None
See application file for complete search history.

(56) References Cited

U.S. PATENT DOCUMENTS

| | | | |
|---|---|---|---|
| 6,362,836 B1 | 3/2002 | Shaw et al. | |
| 6,499,137 B1* | 12/2002 | Hunt | 717/164 |
| 6,714,962 B1 | 3/2004 | Helland et al. | |
| 6,950,850 B1* | 9/2005 | Leff et al. | 709/203 |
| 6,968,535 B2 | 11/2005 | Stelting et al. | |
| 6,983,463 B1 | 1/2006 | Hunt | |
| 7,017,162 B2 | 3/2006 | Smith et al. | |
| 7,076,762 B2 | 7/2006 | Fisher | |
| 7,194,664 B1* | 3/2007 | Fung et al. | 714/45 |
| 7,412,497 B2* | 8/2008 | Viswanath et al. | 709/220 |
| 7,490,331 B2* | 2/2009 | Beisiegel et al. | 719/313 |
| 7,779,429 B2* | 8/2010 | Neil et al. | 719/328 |
| 2001/0049685 A1* | 12/2001 | Carey et al. | 707/103 R |
| 2003/0050932 A1 | 3/2003 | Pace et al. | |
| 2003/0101291 A1* | 5/2003 | Mussack et al. | 709/328 |
| 2003/0154266 A1* | 8/2003 | Bobick et al. | 709/223 |
| 2003/0172135 A1* | 9/2003 | Bobick et al. | 709/220 |
| 2003/0236900 A1* | 12/2003 | Chu | 709/230 |
| 2004/0015898 A1* | 1/2004 | Tewksbary | 717/140 |
| 2004/0064804 A1* | 4/2004 | Daniels et al. | 717/106 |
| 2004/0225678 A1 | 11/2004 | Buzzeo et al. | |
| 2004/0236860 A1* | 11/2004 | Logston et al. | 709/230 |
| 2005/0039173 A1* | 2/2005 | Tondreau et al. | 717/136 |
| 2006/0020695 A1 | 1/2006 | Tantek et al. | |
| 2006/0184926 A1* | 8/2006 | Or et al. | 717/168 |
| 2007/0156375 A1* | 7/2007 | Meier et al. | 703/6 |

OTHER PUBLICATIONS

Jeff Magee, et al. A Constructive Development Environment for Parallel and Distributed Programs. http://citeseer.ist.psu.edu/cache/papers/cs/7132/http:zSzzSzscorch.doc.ic.ac.ukzSz~regiszSzpaperszSziwcds94a.pdf/magee94constructive.pdf. Last accessed Sep. 15, 2006.

Ed Roman, et al. The Technical Benefits of EJB and J2EE Technologies over COM+ and Windows DNA. Middleware Company, Dec. 1999. Prepared for Sun Microsystems, Inc. http://citeseer.ist.psu.edu/cache/papers/cs/16505/http:zSzzSzjava.sun.comzSzproductszSzejbzSzpdfzSzj2ee_dnatwp.pdf/roman99technical.pdf. Last accessed Sep. 15, 2006.

Gary R. Voth, et al. Distributed Application Development for Three-Tier Architectures: Microsoft on Windows DNA. IEEE Internet Computing. Mar.-Apr. 1998. http://ieeexplore.ieee.org/iel4/4236/14762/00670682.pdf?isNumber=. Last accessed Sep. 15, 2006.

Po-Hao Chang. An Adaptive Distributed Object Framework for the Web. http://osl.cs.uiuc.edu/docs/ecoop-phd04/main.pdf. Last accessed Sep. 15, 2006.

Po-Hao Chang, et al. An Adaptive Programming Framework for Web Applications. http://citeseer.ist.psu.edu/cache/papers/cs2/306/http:zSzzSzwww-osl.cs.uiuc.eduzSzdocszSzchang-kim-agha-04zSzchangp_framework.pdf/an-adaptive-programming-framework.pdf. Last accessed Sep. 15, 2006.

* cited by examiner

*Primary Examiner* — Isaac Tecklu (57) ABSTRACT

A spectrum of tier-splitting mechanisms facilitates distributed programming. A rich application model and associated tools enable programmers to write rich distributed applications that can run anywhere. A program can be developed simply as a single tier or tier agnostic application. Subsequently or concurrently, the program can be sliced into multiple tiers in different ways to reflect, for instance, capabilities and/or constraints of a server, client and/or network.

20 Claims, 12 Drawing Sheets

TIER SPLITTING SUPPORT FOR DISTRIBUTED EXECUTION ENVIRONMENTS

BACKGROUND

Programming distributed web-applications today is a painful process that requires programmers to understand many different technologies (e.g., HyperText Markup Language (HTML), Cascading Style Sheets (CSS), JavaScript, Extended Markup Language (XML), Structured Query Language (SQL), Web Service Definition Language (WSDL), Simple Object Access Protocol (SOAP) . . . ) and to make decisions on how to partition their programs between server-side and client-side execution in advance.

Traditionally, web-applications are written with a server-side bias. A browser submits requests for HTML pages that are dynamically generated on the server-side and pushed back as a whole to the browser. Thus, most of the computation is done by the server. Furthermore, since the HTTP protocol that is used to communicate between a browser and a web-server is stateless, the server-side program simply handles single requests and then terminates. It has no intrinsic memory of previous interactions with the browser, nor does it maintain any state until servicing the next request. As a result, the burden is on the programmer to maintain cross-request state using one many features that server-side frameworks provide.

Postmodern AJAX (Asynchronous JavaScript and XML) style web-applications, take a more client centric view where a client explicitly pulls fragments of pages from a web-server. This style of web-applications is closer to standard client programs where most of the computation is done on the client, and the web-server is primarily employed as provider of web-services, not to serve HTML pages. One significant difference between AJAX applications and conventional client applications is that it is hard for AJAX applications to operate in partially connected scenarios. Further, it is difficult to locally persist state between runs of a program.

As mentioned above, both client and server centric programming models require programmers to understand many different technologies and force programmers to decide upfront how to split computation between client and server. This causes programmers to turn their code inside out to deal with asynchronous callbacks, among other distributed programming issues. Matters are further complicated by the fact that they cannot user standard libraries that they may have used to develop conventional applications (e.g., forms, base class . . . ).

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the claimed subject matter pertains broadly to distributed programs and generation thereof. A rich and broad reaching tool-set, application model and supporting infrastructure are provided to facilitate generation of rich distributed applications. These mechanisms enable programmers to develop distributed programs in a single tier or tier agnostic manner. Subsequently or concurrently, programs can be split or sliced into multiple tiers supporting distributed execution across the tiers.

In accordance with one aspect of the disclosure, a tier-splitting component is provided to facilitate transforming single tier applications into multi-tier applications. The tier-splitting component enables automatic or semi-automatic program splitting, for example based on program analysis and execution environment characteristics such as processing capabilities of tier components and network communication speed. The tier-splitting component can also generate dynamic applications that are able to adjust splitting as a function of runtime context information.

According to another aspect, pre-split libraries are provided for use by the tier-splitting component and/or directly by programmers. Such libraries include distributed code associated with program language base classes and graphical interfaces, among other things.

In accordance with yet another aspect, a testing component is provided to enable distributed applications to be tested and debugged. More specifically, such applications can be executed and tested in a protected and/or distributed environment prior deployment in a real distributed system.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided that facilitate generation of distributed applications such as those associated with Internet and/or Web (a.k.a. World Wide Web) programming. A support infrastructure is provided that allows programmers to write rich and broad reaching distributed applications. Initially, applications need only be developed as single tier or tier independent applications, wherein logic is expressed in a tier agnostic manner. These applications can then be split or sliced into multiple tiers in a variety ways, for instance as a function of execution and/or runtime context. As a result, programmers are not forced to make premature decisions about how computation should be split, and they are relieved of many difficulties related to distributed-programming.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
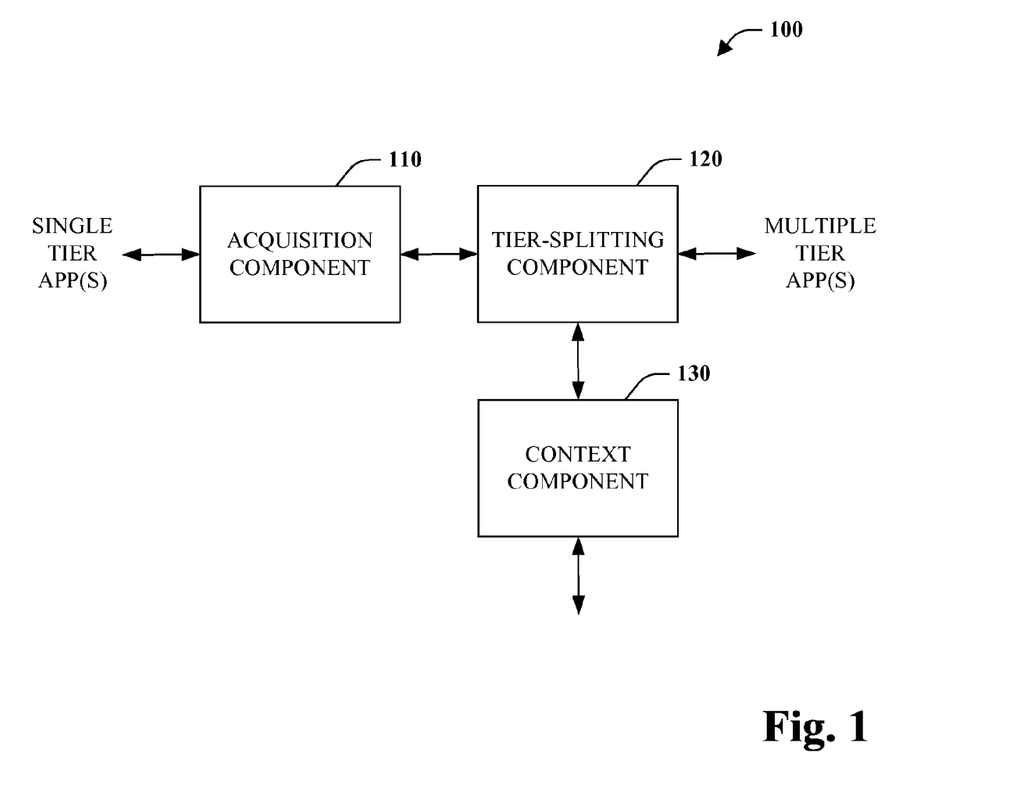
FIG. 1 is a block diagram of a distributed programming system.

Referring initially to FIG. 1, a distributed-programming system 100 is depicted in accordance with an aspect the claimed subject matter. As previously mentioned, conventional distributed programming is an onerous process that requires employment of a multitude of programming languages and techniques, which ultimately complicates development. Further yet, conventional programming forces decisions to be made upfront regarding computational partitioning, among other things. Ultimately, these issues negatively affect development of rich and broad reaching distributed programs, as programmers lack the skills, time and/or patience necessary to build such programs utilizing conventional means. The system 100 substantially mitigates programmer burden by providing a mechanism to aid application tier splitting. The system 100 includes acquisition component 110, tier splitting component 120 and context component 130.

The acquisition component 110 facilitates receipt and/or retrieval of a programming application desired to be tier split. In one embodiment, the application can be specified in a tier agnostic or independent manner, thereby enabling the programmer to focus on application logic rather than intricate distributed processing issues. For example, consider a method that validates information such as an address with a zip code. Rather than focusing on whether validation will take place on a client or server and the mechanisms needed to support such interaction, a programmer can simply concentrate on specifying validation specifics. The acquisition component 110 can provide or otherwise make an acquired application available to the tier-splitting component 120.

The tier-splitting component 120 can aid splitting, slicing or otherwise partitioning an application in a variety of ways. In essence, the tier-splitting component 120 can transform a single tier application into a multiple tier application suitable for distributed processing. In one instance, this can be done automatically; however, as will be discussed infra, component 120 can additionally or alternatively support manual or semi-automatic operation. Moreover, it is to be appreciated that tier-splitting component 120 splits an application in a manner that preserves program semantics. Accordingly, split application execution is semantically equivalent to sequential execution of the application on a single tier.

The context component 130 obtains and supplies execution context to the tier-splitting component 120. Among other things, the execution context can include information about an execution environment such as the number of tiers, computational capacity and/or load for each tier and network communication speed. Based on analysis of an application and the execution context afforded by context component 130, the tier-splitting component 120 can determine or infer an optimal application division. For example, if an application is to be executed on a two-tier client-server architecture and the client is computationally constrained (e.g., thin client), then the application can be split such that the server processes most of the application and simply feeds display data to the client.

Figure 2:
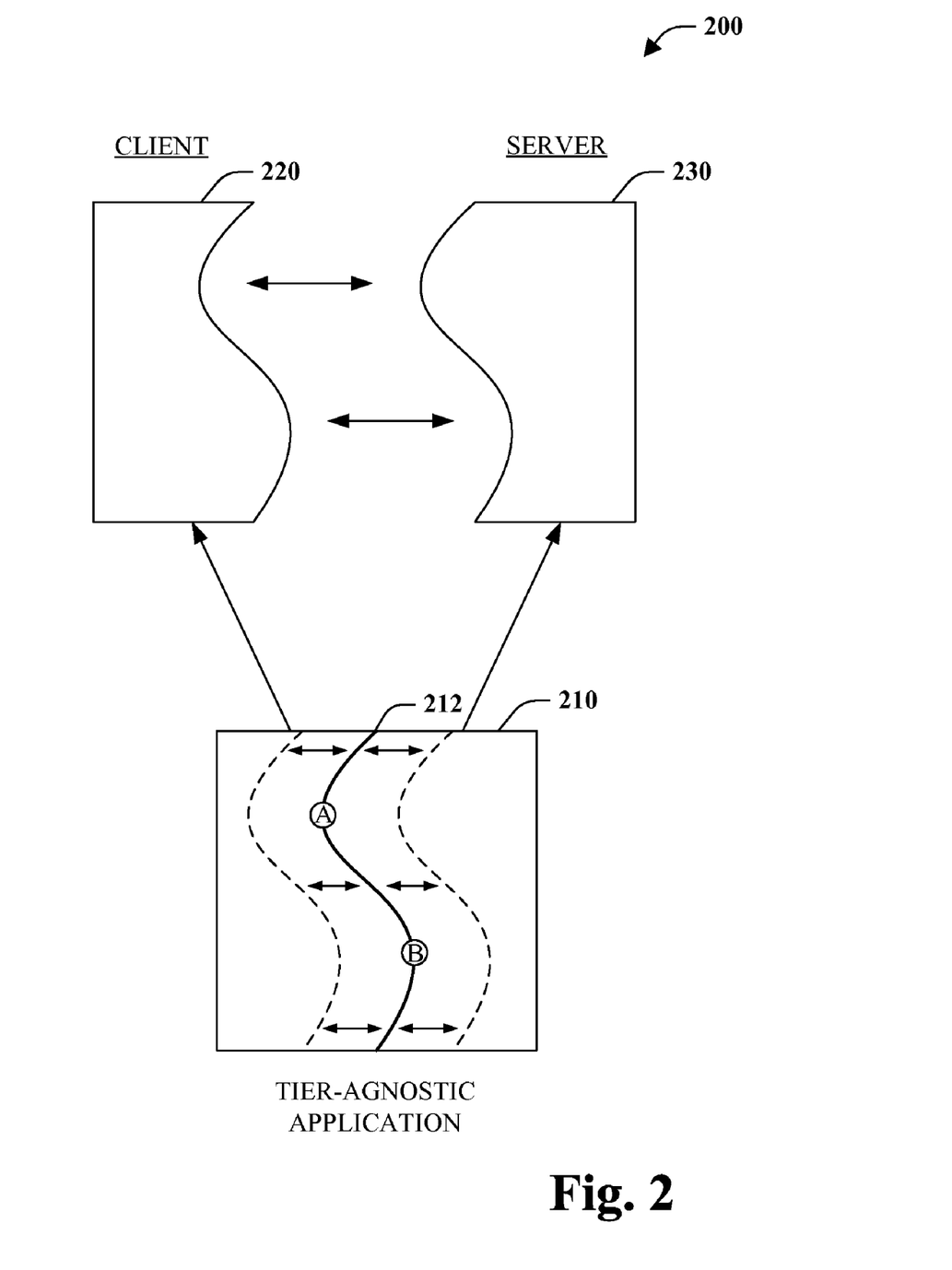
FIG. 2 is a graphical illustration of application splitting.

Turning attention to FIG. 2, provided is graphical illustration 200 of application splitting to provide further clarity with respect aspects of tier splitting. Application 210 can be a tier agnostic application that is to be split amongst a two-tier client-server architecture. As a result, the application 210 can be split into two portions 220 and 230 for execution on the client and server respectively. Two break points "A" and "B" can be noted and utilized to identify the split denoted by solid line 212. These points can be representative of code that can be executed on the client, the server or distributed between the client and the server. As illustrated by the dashed lines, computational distribution can vary based on the capabilities and availability of the client and the server (as well as communication latency). Thus, computation can be pushed more toward the server if the client is constrained or more toward the client, where capable, so as to free up the server for other processing.

Once split, executable portions 220 and 230 of the application 210 need not be completely isolated from one another. While in some instance this may be the case, in other instances the split portions 220 and 230 can cooperate and communicate to facilitate optimal execution. Accordingly, the split process can involve code transformation to facilitate such cooperation via a particular protocol.

In one instance, the split portions can execute asynchronous method and/or function calls. This allows a caller to do other work while the callee does its work. Further, such calls are significant in generating responsive programs, for instance, where there is a long computation of high latency.

Additionally or alternatively, co-routines or other continuation constructs can be employed across tiers. Co-routines are a generalization of subroutines in that they allow multiple entry points and can be suspended and resumed at particular code locations. One or more co-routines including nested sub-routines, co-routines or a combination thereof can be injected by the tier-splitting component 120.

Beyond aiding programmers via a mechanism that supports generation of distributed programs, the subject system can also relieve programmers of the burden of managing state across multiple tiers. More particularly, the tier-splitting component 120 can perform code transformations relating to state preservation and/or communication.

By way of example and not limitation, an application 210 can be a client-server shopping cart application where items are added to and/or removed from a shopping cart until the user finally checks out. Here, state pertains to items in a shopping cart. The tier-splitting component 120 can facilitate state management on the client and the server as well as provide communication between the two such that they are both aware of the items in the shopping cart.

There are many ways in which state can be maintained and as such many eligible manners of code transformation that can be performed by the tier-splitting component 120. In a two-tier system, for example, state can be stored on a client and delivered by the client on every call to an associated server. Alternatively, the server can persist the state to a local database and use some smaller piece of state, such as cookie, to map back to where the state is stored in the database. The client can then query the server for the state where needed. Of course, the technique employed can be dependent upon execution state or context. Returning to the shopping cart example, if the client is somewhat limited it may be desired that state be stored on the server so that the number of items that can be added to the shopping cart is not limited by a small client capacity.

Still further yet, it is to be appreciated that a protocol can be implemented between tiers to ensure proper state is maintained. In the client-server shopping cart example as well as other applications, actions by clients or other computers cannot be completely controlled. This could lead to applications vulnerabilities. For instance, in the shopping cart example a user could initially utilize a client browser to place things in a shopping cart and employ the server to check out. However, a user could clone their browser or open another browser instance and thus another application instance, which could also communicate with the server. In this instance, it could be possible for a user to check out utilizing the first instance of the application and pay for the items added to the cart thereby. However, after check out a user could employ the second instance to continue to add items to the cart and potentially receive them for free if the application is not properly designed. Accordingly, communication protocol can be secured against such as situation by ensuring proper instance communication utilizing some form of encryption, time ordered restrictions on requests and responses or the like.

Figure 3:
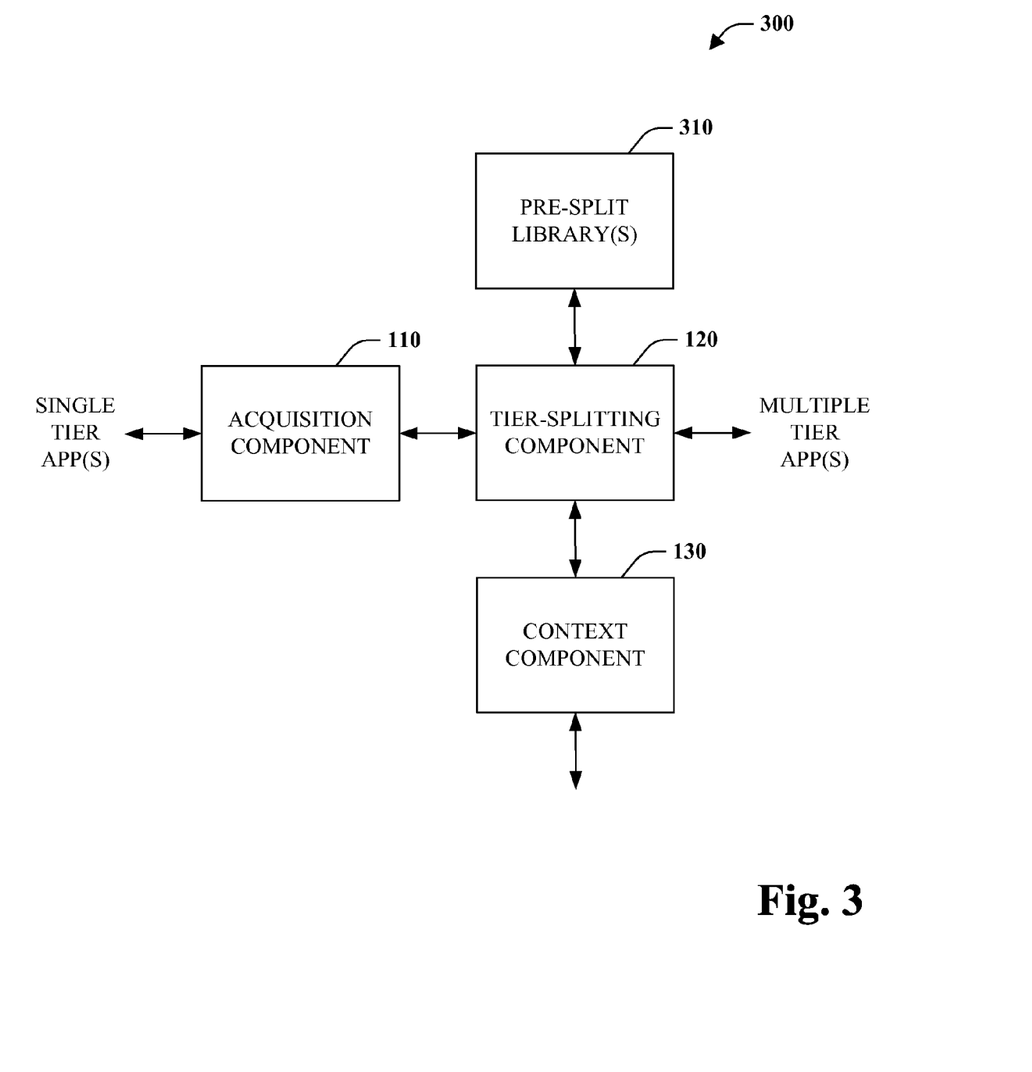
FIG. 3 is a block diagram of a distributed programming system that employs pre-split libraries.

In accordance with one aspect of the claimed subject matter, code transformations can be affected utilizing one or more pre-split libraries 310, as shown in distributed system 300 of FIG. 3. Similar to FIG. 1, the system 300 includes the acquisition component 110, tier-splitting component 120 and context component 130, as previously described. Here, the tier-splitting component 120 can interface and/or interact with one or more pre-split libraries 310 to facilitate application splitting. The pre-split libraries are repositories of code providing mechanisms needed to transform an application into a distributed application executable across multiple tiers. In one instance, such libraries can be base class libraries and/or those associated with a graphical user interface (GUI). The tier-splitting component 120 can transform or link application code to library components in furtherance of code slicing as determined as a function of execution context, for instance. By way of example, the tier-splitting component 120 can transform or replace synchronous code with asynchronous code for the same method afforded by a pre-split library component.

Figure 4:
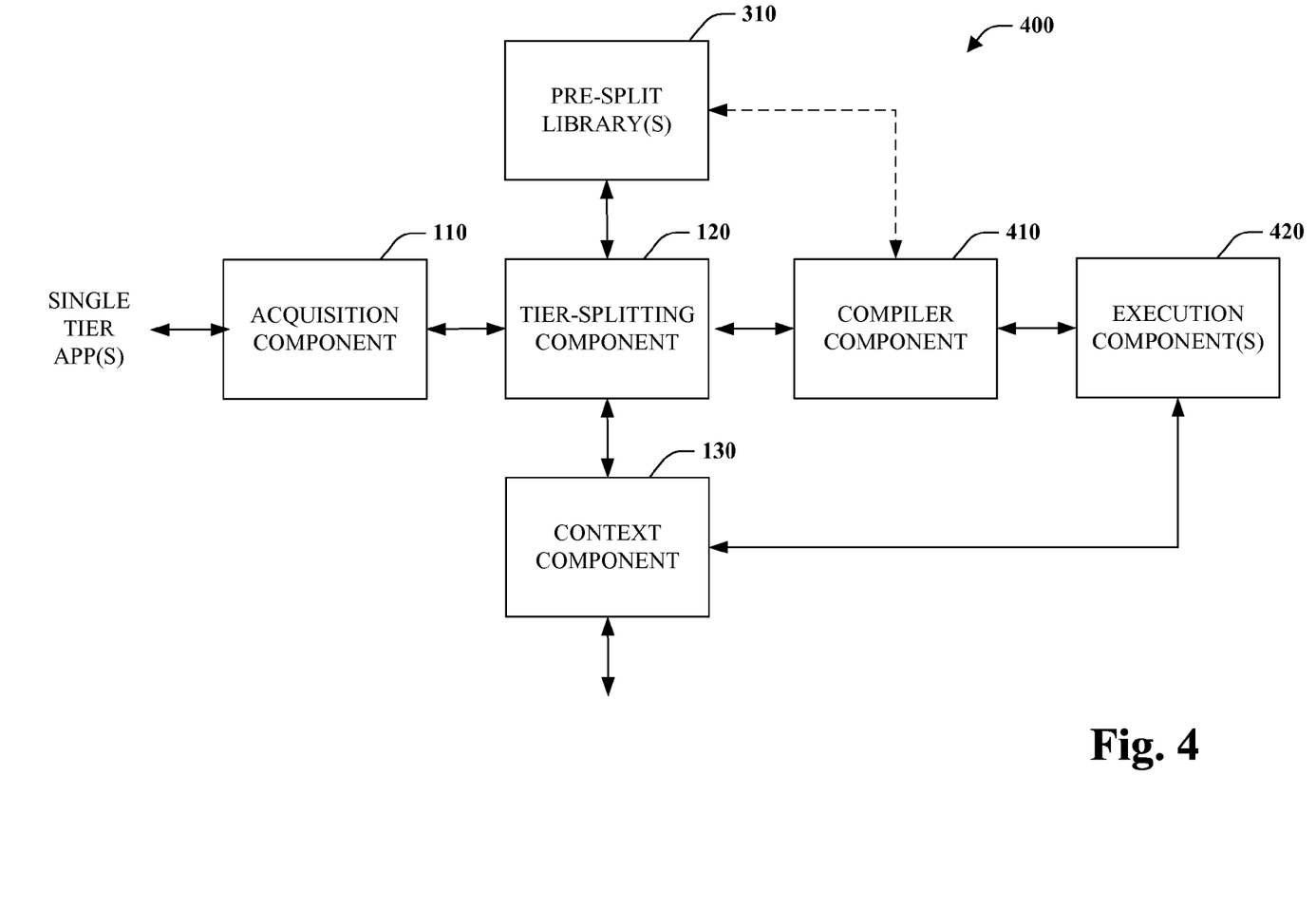
FIG. 4 is a block diagram of an extended distributed programming system including a compiler and execution engine.

Referring to FIG. 4, an extended distributed programming system 400 is illustrated in accordance with an aspect of the claimed subject matter. Similar to systems 100 and 300, system 400 includes the acquisition component 110, tier-splitting component 120, context component 130 and pre-split library(s) 310, as previously described. In brief, the acquisition component 110 acquires a tier agnostic computer program and makes it available to the tier-splitting component 120, which utilizes context information and the pre-split libraries to transform the code into distributed code executable across multiple tier architectures. Furthermore, the system 400 includes a compiler component 410 and execution component(s) or engine(s) 420.

The compiler component 410 compiles or translates a high-level source program to lower level target code. In accordance with one embodiment, the compiler 410 can transform application code into an intermediate language to facilitate execution by a virtual machine or common language infrastructure (CLI) implementation (e.g., Common Language Runtime (CLR), Java Virtual Machine JVM). In this manner, applications can be written in numerous programming languages and compiled to a common intermediate language executable across multiple computer platforms. Accordingly, an initial tier independent or agnostic application programmed in one of many languages (e.g., C, C#, Java . . . ) can be modified to support multiple tier architectures and subsequently compiled into a common intermediate language. It should be appreciated that the compiler 410 can perform tasks previously described with respect to the tier-splitting component. For example, prior to or during compilation, the compiler 410 can insert identified/linked code residing in at least one of the pre-split libraries 310. Further yet, in one embodiment, the tier-splitting component 130 can form part of the compiler 410.

The execution component(s) 420 are operable to execute compiled program code on designated architectures. For example, common intermediate language code can be compiled or interpreted to run on a particular server or client device. In one instance, such code can be executed by a virtual machine resident on a tier computer. Further yet, the code can be run within a browser or other like application.

Where the code is to be executed by a browser or other target, additional mechanisms may be needed or otherwise provide useful functionality. For instance, where a virtual machine is not natively supported by a browser/target it may be necessary to provide such support. This can be accomplished by embedding an intermediate language into a supported browser/target language. For example, a common language infrastructure implementation such as CLR can be embedded within JavaScript or the like such that CLR supported intermediate code can be compiled or interpreted to JavaScript. This enables code to run on browsers/targets that do not support a particular virtual machine or common runtime. Further, it is to be noted that libraries will vary from standard such that they can be transparently implemented across tiers for multiple targets.

The execution component 420 can also be employed to affect dynamic splitting or computational distribution as a function of execution context information provided by the context component 130. Previously, it was noted that tier independent applications could be split early on based on context information provided about its execution environment such as the number of tiers and the capabilities of resources provided thereby. However, resource availability, computation load, network speed, inter alia can change during execution. Additionally, computational capabilities can differ from those at the time of compilation. Accordingly, splitting/slicing or other changes can be made at runtime based on execution context provided by communicatively coupled context component 130.

Figure 5:
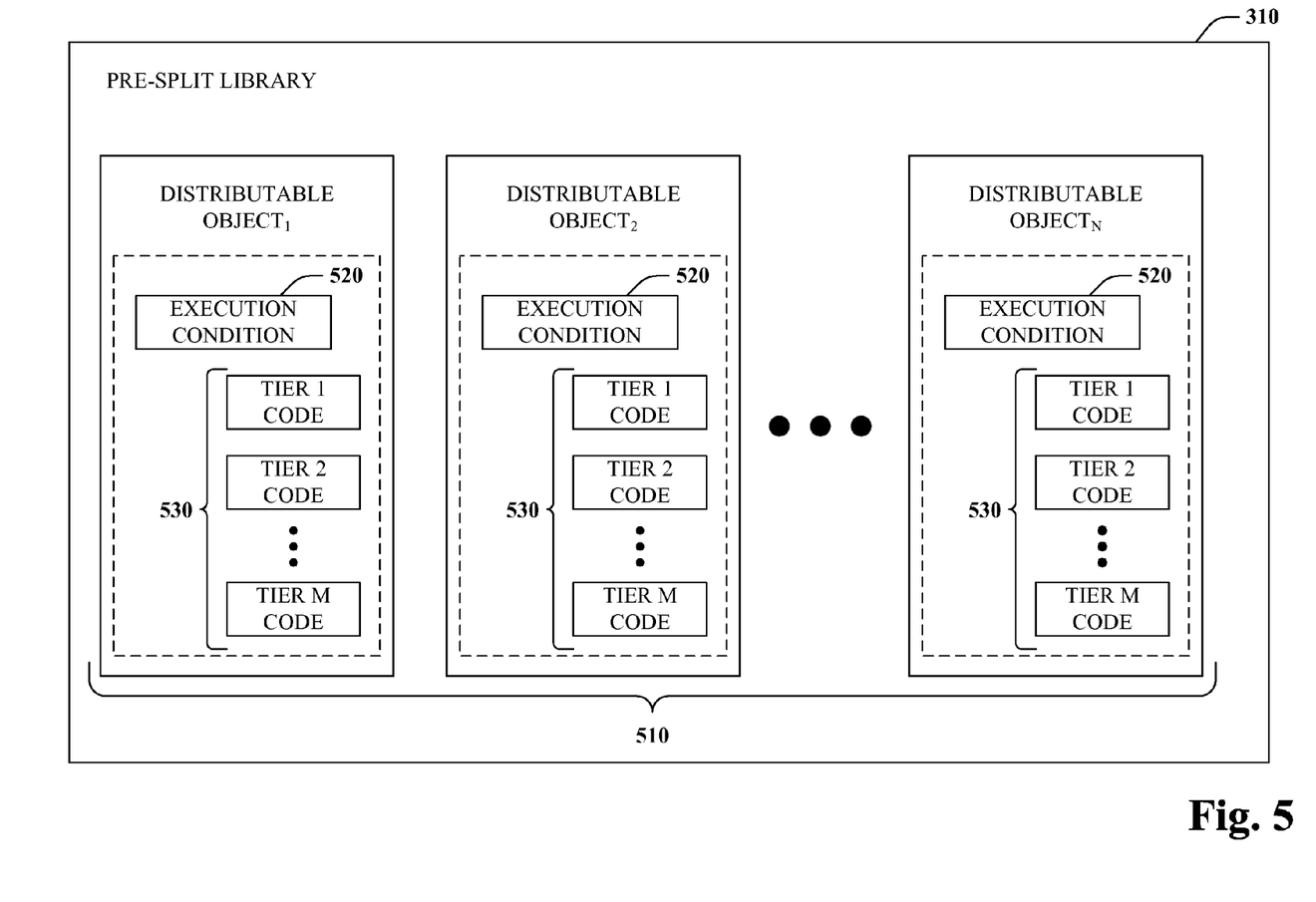
FIG. 5 illustrates a representative pre-split library.

Such functionality can be implemented via incorporation of context sensitive/aware code. This code can be found in one or more of the pre-split libraries 310 and injected into an application by the tier splitting component 120 and/or compiler 410. Turing briefly to FIG. 5, an exemplary pre-split library 310 is illustrated to provide clarity with respect to injected code. As shown, the library 310 can include a plurality of distributable objects 510 (Distributable Object$_1$-Distributable Object$_N$, where N is greater than or equal to one). The objects 510 represent potential application split points, where the object can be executed on and/or across one or more tiers. For example, one distributable object 510 can be a data validation method to enable validation to be executed on a client and/or a server. Each distributable object 510 can include an execution condition 520 and one or more tier code components 530 (Tier Code$_1$-Tier Code$_M$, where M is greater than or equal to one). The execution condition 520 can determine which of the tier code 520 is executed as a function of execution context. Accordingly, a manner in which a component is split, if at all, can be determined and/or dynamically adjusted in accordance with runtime context. By way of example, if a server is over burdened with processes, it can send a piece of code previously provided for server execution to a client for execution.

Figure 6:
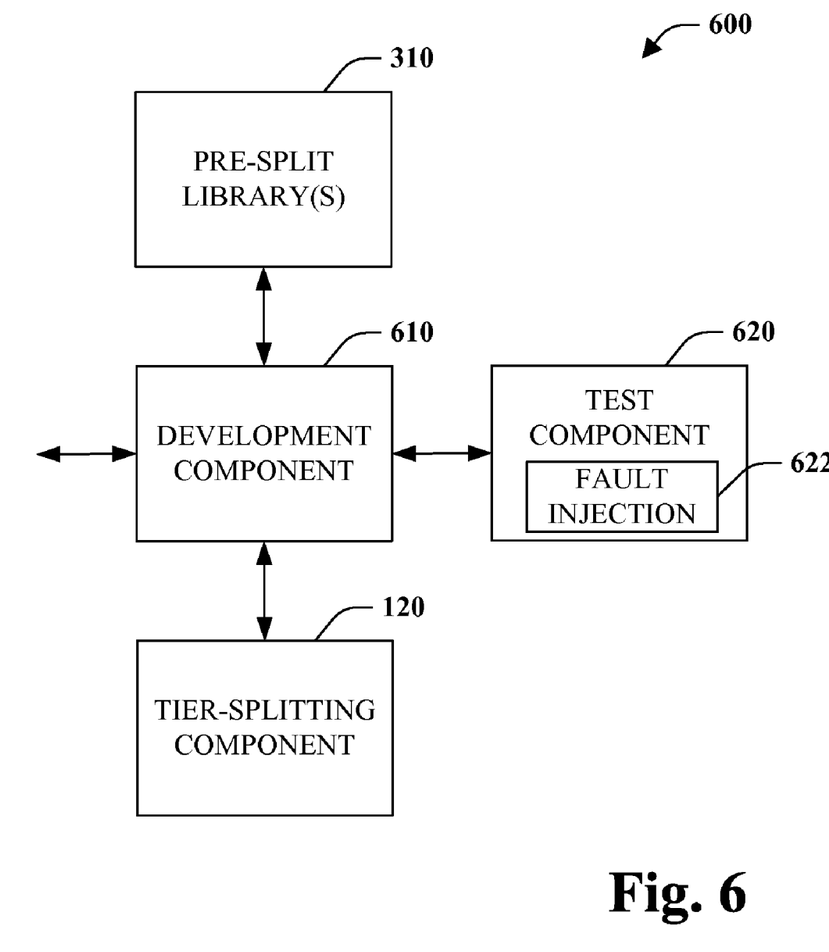
FIG. 6 is a block diagram of a distributed programming development system.

Referring to FIG. 6, a distributed programming development system 600 is depicted. System 600 aids a user in generating distributed code. Development component 610 provides a development environment for producing code including, for example an editor, automated build tools, a debugger and/or other mechanisms included in integrated development environments. The pre-split libraries 310 provide code that can be utilized by programmers to generate tier-split or splitting applications. More specifically, the libraries can resemble conventional base class and/or GUI libraries that provide inherent support for multi-tier architectures. Accordingly, users can program without explicitly specifying support for distributed processing but also referencing or interfacing with the pre-split libraries rather than other standard libraries.

For the most part, programmers need not be aware of how libraries and code is sliced. The application programming interfaces (APIs) exposed to the programmer and the manner of calling them need not be different. For example, a programmer can simply create an instance of a Button and a TextBox and assign an event handler to the button to greet a user as follows:

```
Dim WithEvents B As New Button( )
Dim T As New TextBox( )
Sub Clicked( ) Handles B.Click
    T.Text = "Hello World"
End Sub
```

Depending on the actual slicing, this code call can run completely on a client or a server, or a hybrid of both.

Similarly and as previously mentioned, it is also significant to provide programmers with stateful services. Any given class that satisfies certain conditions can be split such that the actual implementation performs computations on different tiers while maintaining state. For example, a programmer can write a normal stateful class declaration such as the following simple counter:

```
Class Counter
    Private N As Integer
    Public Function Up( ) As Integer
        N += 1
        Return N
    End Function
    Public Function Down( ) As Integer
        N -= 1
        Return N
    End Function
End Class
```

This class can then be realized in a plurality of ways, with respect to where the code runs, where and how instance state is stored, etc. However, no matter how the class is actually implemented, the programmer interacts with it using the same interface.

Furthermore, it is to be noted that the system 100, by way of development component 610 and pre-split libraries 310, can also provide refactoring support to supply an asynchronous interface to a given class or API via a variety of possible matters. For example, the libraries 310 can expose a synchronous interface for validation that returns a Boolean, but internally the validation performs asynchronous calls. Hence, it appears as synchronous but internally it can perform two calls and wait for a result. Splitting can thus be hidden inside a component that is invisible to a programmer. However, splitting can also be outside a component and visible to a programmer. Programmers can also manually program at least portions of the code for distributed execution it they so desire.

Still further, the development component 610 can be coupled to the tier-splitting component 120 to facilitate further distributed transformations. In other words, while programmers can manually program distributed execution and/or call interfaces that perform hidden distributed functionality, the tier-splitting component 120 can be employed additionally or alternatively to partition an application automatically for example by inferring optimal splits and/or code transformations base on static and/or dynamic analysis of a program and execution environment characteristics.

Also included in the distributed programming development system 600 is test component 620, communicatively coupled to the development component 610. The test component 620 provides a mechanism to test distributed programming applications generated via system 600, among other ways. The test component 620 can provide a protected and/or simulated environment for execution of distributed programs. In this environment, tests can be performed to ensure that the program responds properly. In particular, fault injection component 622 can be utilized to test code that contains asynchronous calls by injecting faults or latency. If needed, the development component 610 can be employed to correct any problems. In this manner, manually, semi-automatically and/or automatically generated distributed programs can be tested and subsequent debugged, if needed, prior to real deployment.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, tier-splitting component 120 can employ such mechanisms to infer optimal cut points for distributed applications based on context information and the applications themselves.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
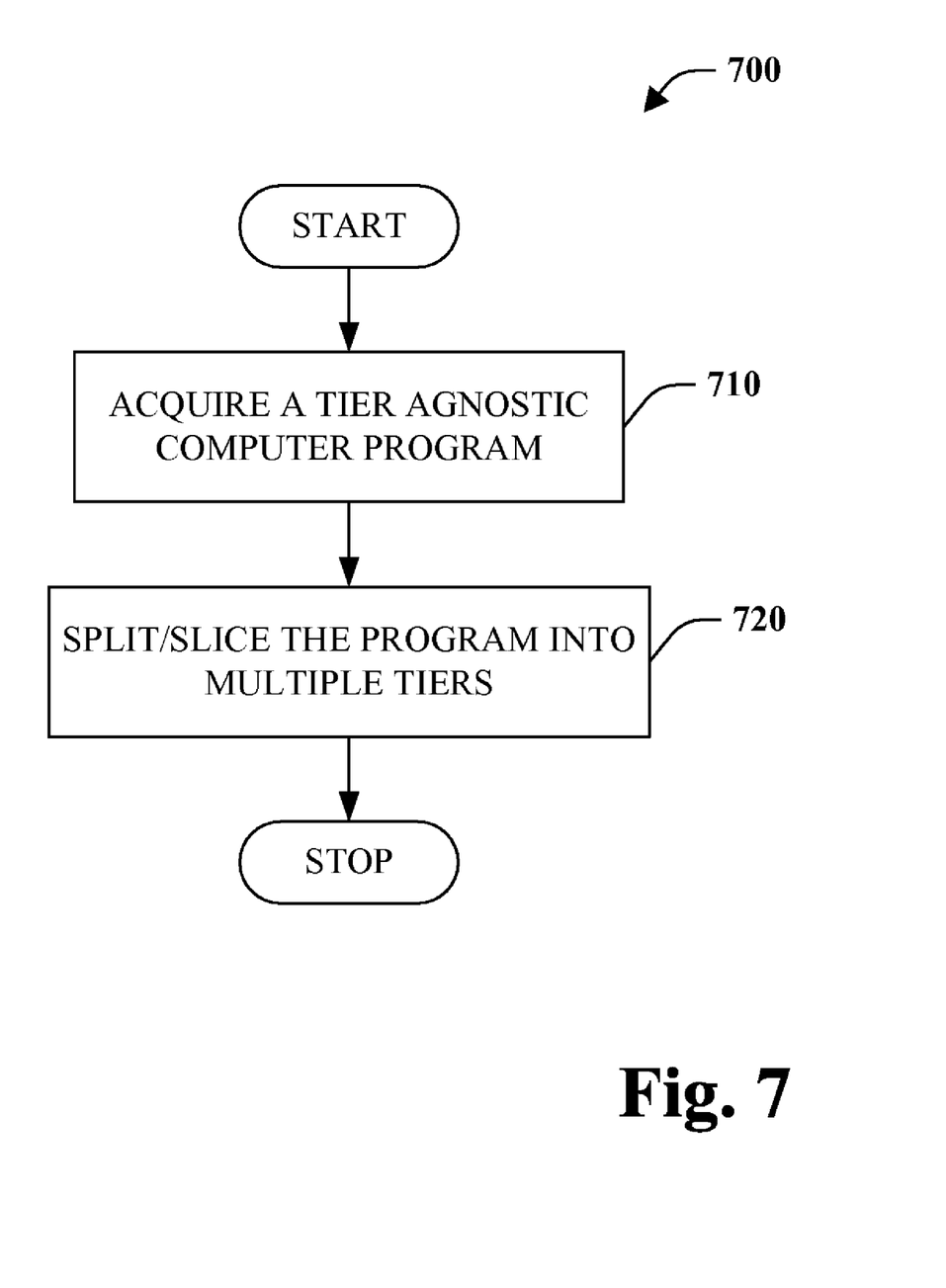
FIG. 7 is a flow chart diagram of a method of distributed program generation.

Referring to FIG. 7, a method of generating distributed programs 700 is illustrated in accordance with an aspect of the claimed subject matter. At reference numeral 710, a tier independent or agnostic application/program is acquired. Such a program can be manually, semi-automatically or automatically generated. In this manner, programmers can be relieved of burdens associated with coding distributed programming constructs and interactions and focus on underlying programmatic logic. At reference numeral 720, the application is split or sliced into multiple tiers. In other words, the program can be augmented or transformed into a distributed program based of example on the program itself and execution environment characteristics. This act can be performed completely automatically and/or hidden from the user and/or with programmer interaction and visible distributed code.

Figure 8:
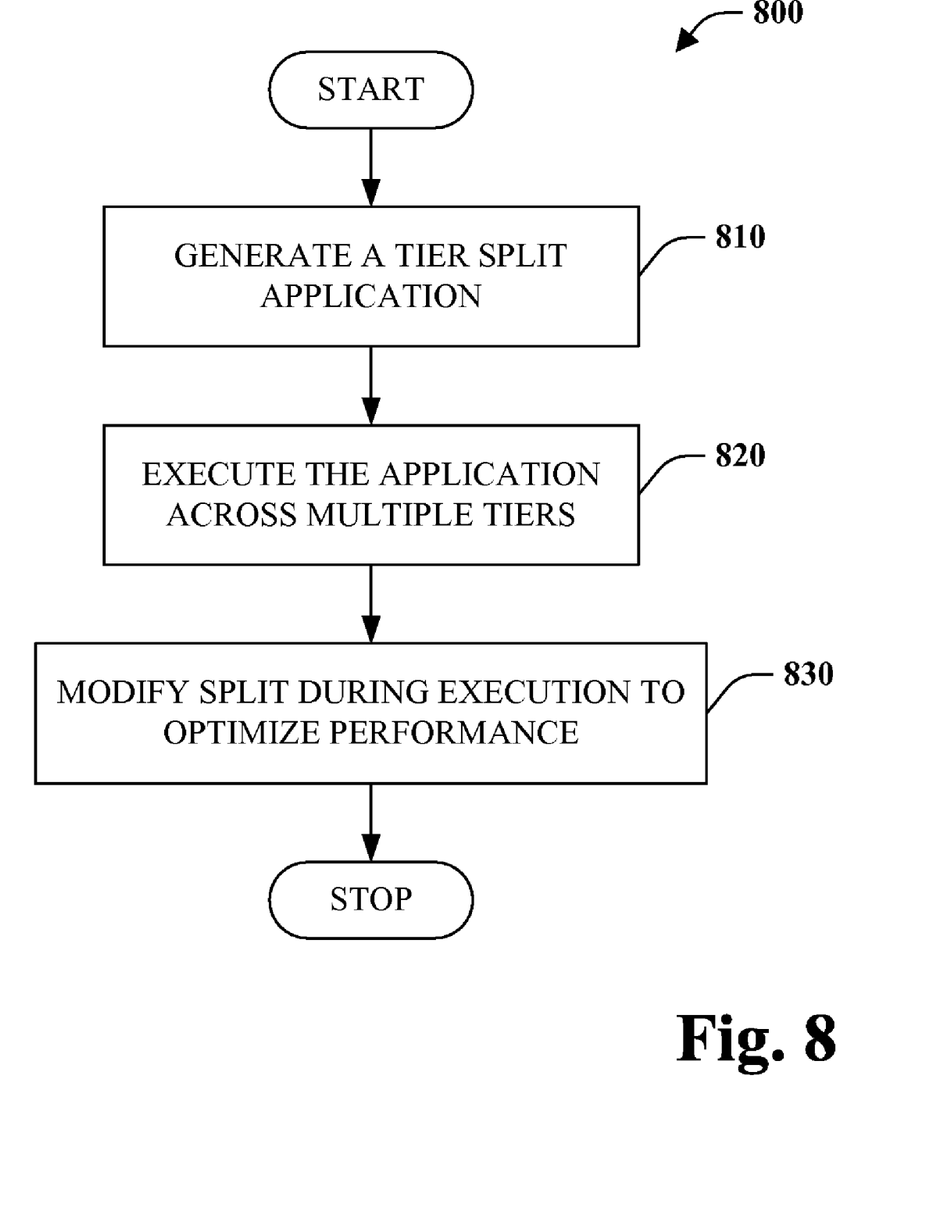
FIG. 8 is a flow chart diagram of a method of tier splitting.

FIG. 8 is a flow chart diagram of a method 800 of tier splitting. At reference numeral 810, a tier split application is generated. As described with respect to FIG. 7 an initial tier-agnostic application can be generated, which can be split subsequently or concurrently as a function of the program itself and execution environment characteristics. At reference numeral 820, the program can be executed in a real distributed execution environment across multiple tiers. At numeral 830, the executing program can modify tier splitting based on execution context. Accordingly, while the application can be initially split as a function of known environmental characteristics, splitting can be altered dynamically at runtime to ensure optimal distribution given resource load, availability, network latency and/or the like. In accordance with one embodiment, dynamic functionality can be injected into a program from a pre-factored library, for instance.

Figure 9:
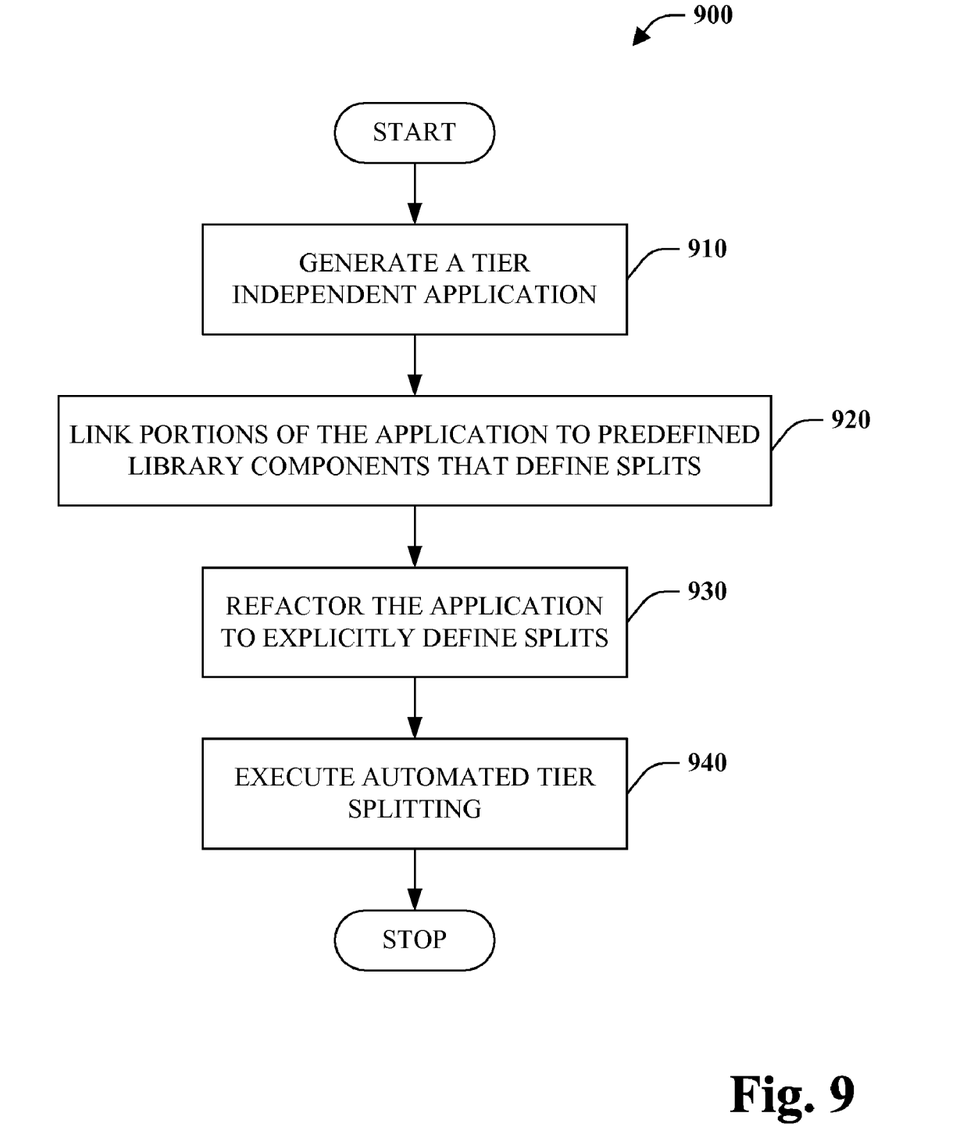
FIG. 9 is a flow chart diagram of a method of distributed program generation.

FIG. 9 depicts a method of distributed program generation 900 in accordance with an aspect of the claimed subject matter. At reference numeral 910, a tier independent application/program is generated defining programmatic logic without regard to execution environment characteristics. Subsequently or concurrently, portions of an application are linked to predefined library components that define splits and provide supporting infrastructure at numeral 920. For example, rather than linking a method of function call to a standard library interface or API, links can be provided to one or more pre-split or pre-factored libraries that can be transparently implemented across multiple tier targets. At reference numeral 930, the program can be refactored by a programmer, for instance, to explicitly define splits and/or distributed processing logic. At numeral 940, automatic tier splitting can be executed on the program to further augment an application to optimize splitting and distributed processing in light of the program and execution environment characteristics. Rule based logic and/or machine-learning techniques can be utilized to identify optimal cut points, among other things.

Figure 10:
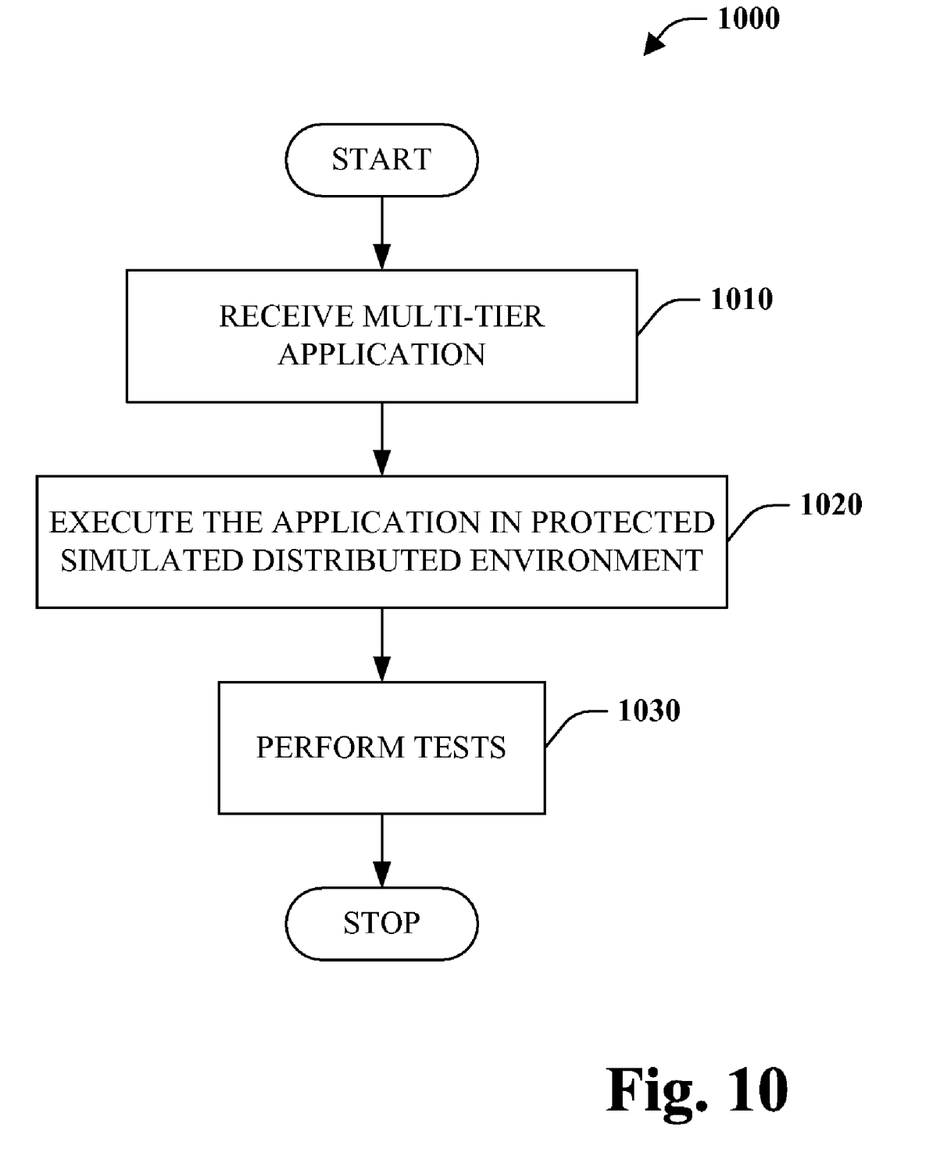
FIG. 10 is a flow chart diagram of a distributed program evaluation methodology.

FIG. 10 is a flow chart diagram of a method of evaluating distributed programs. At numeral 1010, a multi-tier application such as but not limited to a client-server application is acquired. Such an application can be generated in any number of manners including those described supra. At reference numeral 1020, the application is executed in a protected and/or simulated distributed execution environment. At numeral 1030, the application can be tested of evaluated for instance by injecting faults and/or increasing communication latency. Programs can thus be debugged in a protected and/or simulated distributed environment, effectively separating programmatic concerns. Once all required functionality has been satisfactorily implemented, the programs can be deployed in a real distributed environment.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
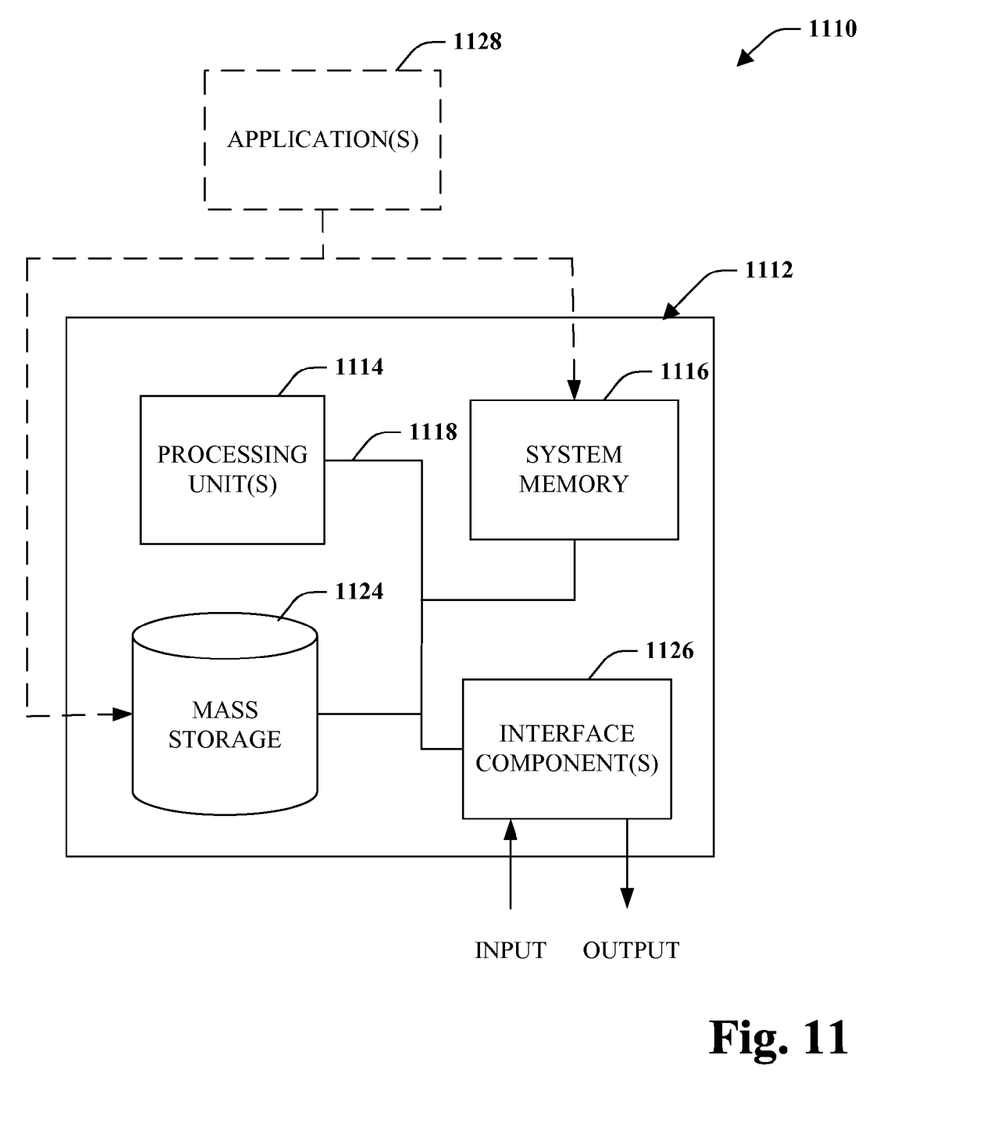
FIG. 11 is a schematic block diagram illustrating a suitable operating environment for aspects of the subject disclosure.
Figure 12:
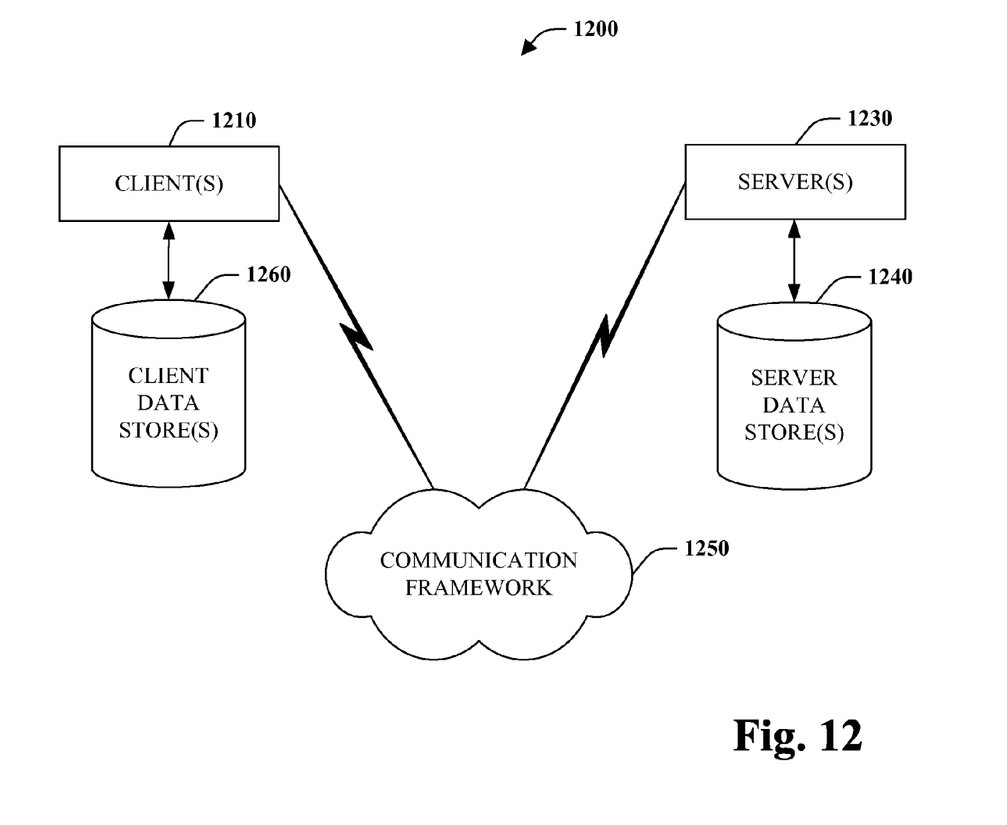
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

By way of example, this is one potential multi-tier architecture on which applications can be executed. Based on the characteristics and/or capabilities of both the client(s) 1210 and the server(s) 1230 as well as runtime contextual information, initially specified tier agnostic applications can be transformed to run optimally on the client(s) 1210, the server(s) 1230 or both the client(s) 1210 and the server(s) 1230. In accordance with one embodiment, applications can be run on a browser or other target application on the client(s) 1210.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer programming system, comprising:
at least one processor;
a component that acquires a tier independent computer application;

a splitting component, at least partially executed by the at least one processor, that links the application to one or more pre-split libraries to split the application into a plurality of tiers to facilitate distributed execution across the tiers and preservation of sequential semantics, and that replaces synchronous code of the tier independent computer application with asynchronous code; and a test component that enables at least one of testing or debugging of the split application in a simulated distributed environment.

2. The system of claim 1, wherein the one or more pre-split libraries include at least one of one or more asynchronous calls or one or more co-routines.

3. The system of claim 1, the splitting component is included within a compiler.

4. The system of claim 1, further comprising a compiler component that transforms virtual machine code into browser executable code.

5. The system of claim 1, further comprising a context component that identifies execution context to the splitting component to facilitate optimal tier splitting.

6. The system of claim 5, the context component identifies runtime execution context to facilitate runtime adaptive splitting.

7. The system of claim 1, the splitting component injects one or more co-routines into the application to facilitate distributed computation across the tiers.

8. The system of claim 1, the splitting component injects asynchronous method calls with respect to computationally intense operations.

9. The system of claim 1, a protocol is utilized across the tiers to ensure proper state is maintained.

10. The system of claim 1, wherein the test component injects at least one of a fault or latency to test code that contains asynchronous calls.

11. A computer application development method, comprising:
    acquiring a tier agnostic computer application;
    transforming the application into a multiple tier application, using at least one processor, to facilitate distributed processing, the transforming including replacing synchronous code of the tier agnostic computer application with asynchronous code, the transforming further including linking the application to one or more pre-split libraries; and
    testing the multiple tier application in at least one of a protected or simulated distributed environment.

12. The method of claim 11, transforming comprising injecting at least one of one or more co-routines or one or more asynchronous calls to facilitate interaction across tiers.

13. The method of claim 11, transforming further comprising preserving state across tiers.

14. The method of claim 11, wherein transforming the application comprises:
    automatically transforming the application as a function of at least one of program analysis or execution context.

15. The method of claim 11, further comprising compiling the multiple tier application into an intermediate language representation.

16. The method of claim 11, wherein testing the multiple tier application comprises:
    injecting at least one of a fault or latency to test code that contains asynchronous calls.

17. The method of claim 11, wherein the multiple tier application is runtime adaptive to facilitate dynamic adjustment of distributed computation based on resource availability.

18. A dynamic programming system, comprising:
    at least one processor;
    means for obtaining execution context;
    means for automatically transforming a single tier application into a multiple tier application as a function of the execution context, the means for automatically transforming replacing synchronous code of the single tier application with asynchronous code, the means for automatically transforming linking the single tier application to one or more pre-split libraries; and
    means, at least partially executed by the at least one processor, for testing the multiple tier application in at least one of a protected or simulated distributed environment.

19. The system of claim 18, the multiple tier application is runtime adaptive to facilitate dynamic adjustment of distributed computation based on resource availability.

20. The system of claim 18, wherein the means for automatically transforming injects one or more co-routines into the single tier application to facilitate distributed computation across the tiers.

* * * * *